United States Patent
Bou-Ghannam et al.

(10) Patent No.: US 9,043,076 B2
(45) Date of Patent: May 26, 2015

(54) AUTOMATING PREDICTIVE MAINTENANCE FOR AUTOMOBILES

(71) Applicant: International Business Machines Corporation, Armonk, NY (US)

(72) Inventors: Akram Bou-Ghannam, Lake Worth, FL (US); Michael J. Dockter, Wellington, FL (US)

(73) Assignee: International Business Machines Corporation, Armonk, NY (US)

(*) Notice: Subject to any disclaimer, the term of this patent is extended or adjusted under 35 U.S.C. 154(b) by 45 days.

(21) Appl. No.: 13/893,266

(22) Filed: May 13, 2013

(65) Prior Publication Data

US 2014/0336869 A1      Nov. 13, 2014

(51) Int. Cl.
| | |
|---|---|
| *G01M 17/00* | (2006.01) |
| *G07C 5/00* | (2006.01) |
| *G05B 23/00* | (2006.01) |
| *G07C 5/08* | (2006.01) |

(52) U.S. Cl.
CPC . *G07C 5/00* (2013.01); *G05B 23/00* (2013.01); *G07C 5/008* (2013.01); *G07C 5/085* (2013.01)

(58) Field of Classification Search
CPC .......................... G05B 23/0283; G06F 19/00
USPC .................... 701/29.1, 29.9, 31.5, 31.9, 33.7; 340/426.16
See application file for complete search history.

(56) References Cited

U.S. PATENT DOCUMENTS

| | | | |
|---|---|---|---|
| 6,738,748 B2 | 5/2004 | Wetzer | 705/7.21 |
| 7,596,435 B1* | 9/2009 | Tripathi et al. | 701/29.3 |
| 2006/0097854 A1 | 5/2006 | Basu et al. | 340/425.5 |
| 2010/0042287 A1 | 2/2010 | Zhang et al. | 701/31.4 |
| 2010/0063668 A1* | 3/2010 | Zhang et al. | 701/30 |

FOREIGN PATENT DOCUMENTS

| | | | |
|---|---|---|---|
| CA | 2 425 803 | 12/2010 | G06Q 10/00 |

OTHER PUBLICATIONS

Abraham, "Cars learn to communicate with each other," The Economic Times, Sep. 2010, 2 pages.
Head et al., "Using Commercial Off-The-Shelf Business Intelligence Software Tools to Support Aircraft and Automated Test System Maintenance Environments," 2010 IEEE AUTOTESTCON, Sep. 2010, 6 pages.
"Method and System for Suggesting a Maintenance Action for a Vehicle based on Forecasted Weather Information and Travel Routes," IPCOM000210324D, ip.com, Aug. 2011, 3 pages.

(Continued)

*Primary Examiner* — Thomas G Black
*Assistant Examiner* — Luke Huynh
(74) *Attorney, Agent, or Firm* — VanLeeuwen & VanLeeuwen; Jeffrey S. LaBaw (57) ABSTRACT

An approach is provided to automate predictive vehicle maintenance. In the approach, a vehicle's information handling system receives vehicle data transmissions from a number of other vehicles in geographic proximity to the vehicle. Both the vehicle and the other vehicles correspond to various vehicle types that are used to identify those other vehicles that are similar to the vehicle. The sets of received vehicle data transmissions that are received to similar vehicles are analyzed with respect to a plurality of vehicle maintenance data corresponding to the vehicle. The analysis of the vehicle data transmissions resulting in predictive vehicle maintenance recommendations pertaining to the first vehicle.

20 Claims, 7 Drawing Sheets

(56) References Cited

OTHER PUBLICATIONS

"Wireless Communication System Capability Within Automobiles for Automated and Continuous or Periodic Communication of Automobile Mainenance Needs and/or Requirements to Relevant Parties," IPCOM000215767D, ip.com, Mar. 2012, 3 pages.

Woodyard, "Cars soon may 'talk' to roads, each other," USA Today, Nov. 2005, 4 pages.

* cited by examiner

AUTOMATING PREDICTIVE MAINTENANCE FOR AUTOMOBILES

TECHNICAL FIELD

The present disclosure relates to an approach that provides predictive maintenance for automobiles by communicating maintenance data between automobiles during use.

BACKGROUND OF THE INVENTION

Today, predictive maintenance for automobiles is absent for most automobiles. Automobile maintenance is either performed at failure or is performed as part of "routine maintenance." In larger mechanical systems owned by corporations, the craft of predictive maintenance is being heralded as cost reducing. Predictive maintenance prevents downtime and is less expensive than periodic (preventative) maintenance. The problem is that traditional predictive maintenance systems are not scalable to single automobiles with traditional automobile owners rather than large system owned by large organizations. Predictive maintenance is the highest form of maintenance desired. It considers the specifics of a particular situation, then anticipates and intervenes before failure occurs. Predictive maintenance generally depends on monitoring individual components in actual operation, anticipating requirements for maintenance, and executing this maintenance before failure occurs. A further goal with predictive maintenance is to reduce costs by eliminating waste associated with unnecessary maintenance often performed during routine, or preventative, maintenance procedures. Predictive maintenance moves away from preventative maintenance and builds on other types of maintenance including reliability-centered maintenance, and condition-based maintenance. Preventive maintenance establishes fixed repair intervals. In contrast, Reliability Centered Maintenance is performed based on the reliability of the components in actual usage in actual conditions. Unlike preventive maintenance, Reliability Centered Maintenance is not based on fixed time maintenance intervals. Working in conjunction with Reliability Centered Maintenance, Condition Based Maintenance (CBM) is maintenance that is performed based on the actual condition of component.

SUMMARY

An approach is provided to automate predictive vehicle maintenance. In the approach, a vehicle's information handling system receives vehicle data transmissions from a number of other vehicles in geographic proximity to the vehicle. Both the vehicle and the other vehicles correspond to various vehicle types that are used to identify those other vehicles that are similar to the vehicle. The sets of received vehicle data transmissions that are received to similar vehicles are analyzed with respect to a plurality of vehicle maintenance data corresponding to the vehicle. The analysis of the vehicle data transmissions resulting in predictive vehicle maintenance recommendations pertaining to the first vehicle.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
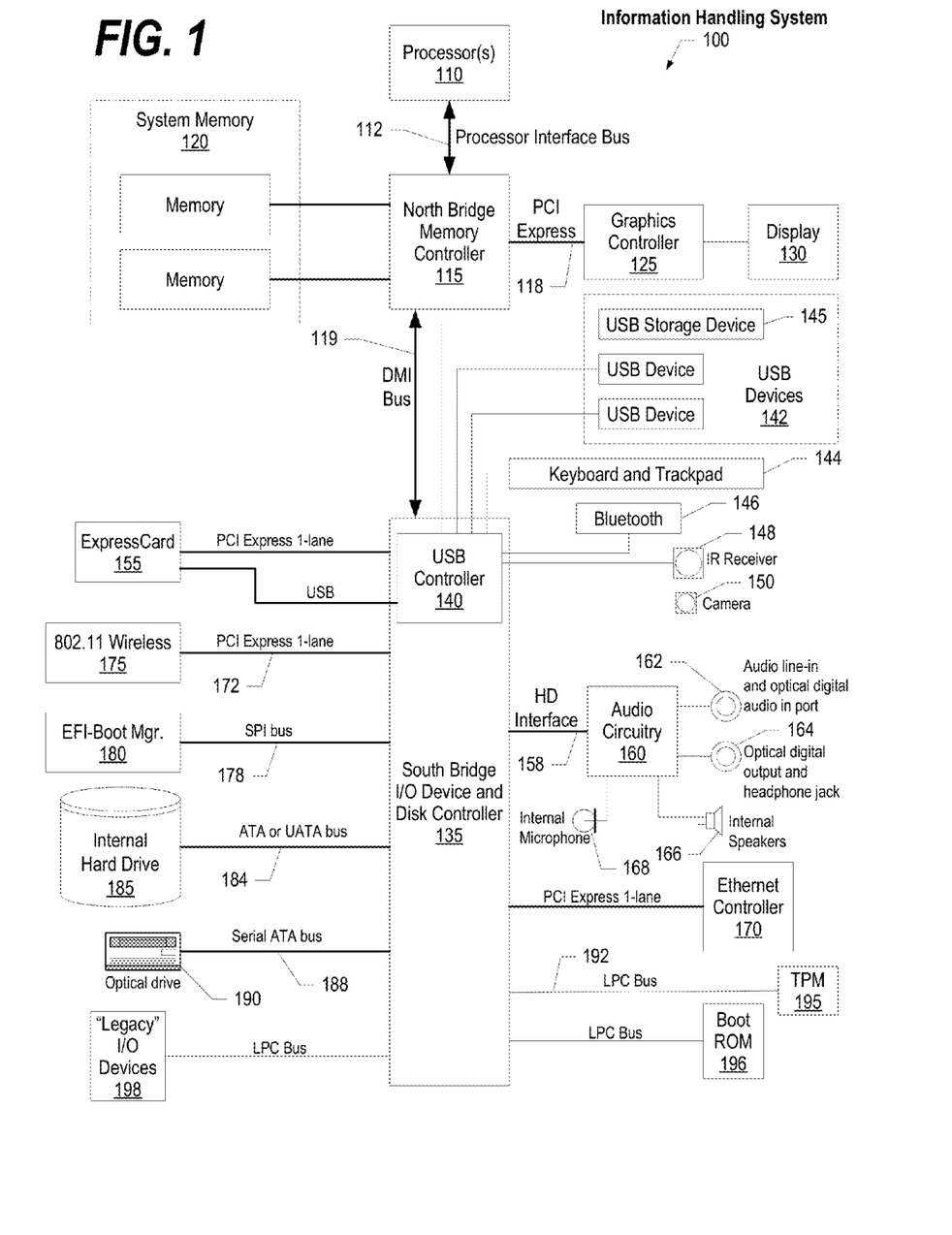
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. EFI-Boot Manager 180 connects to Southbridge 135 using SPI bus 178. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
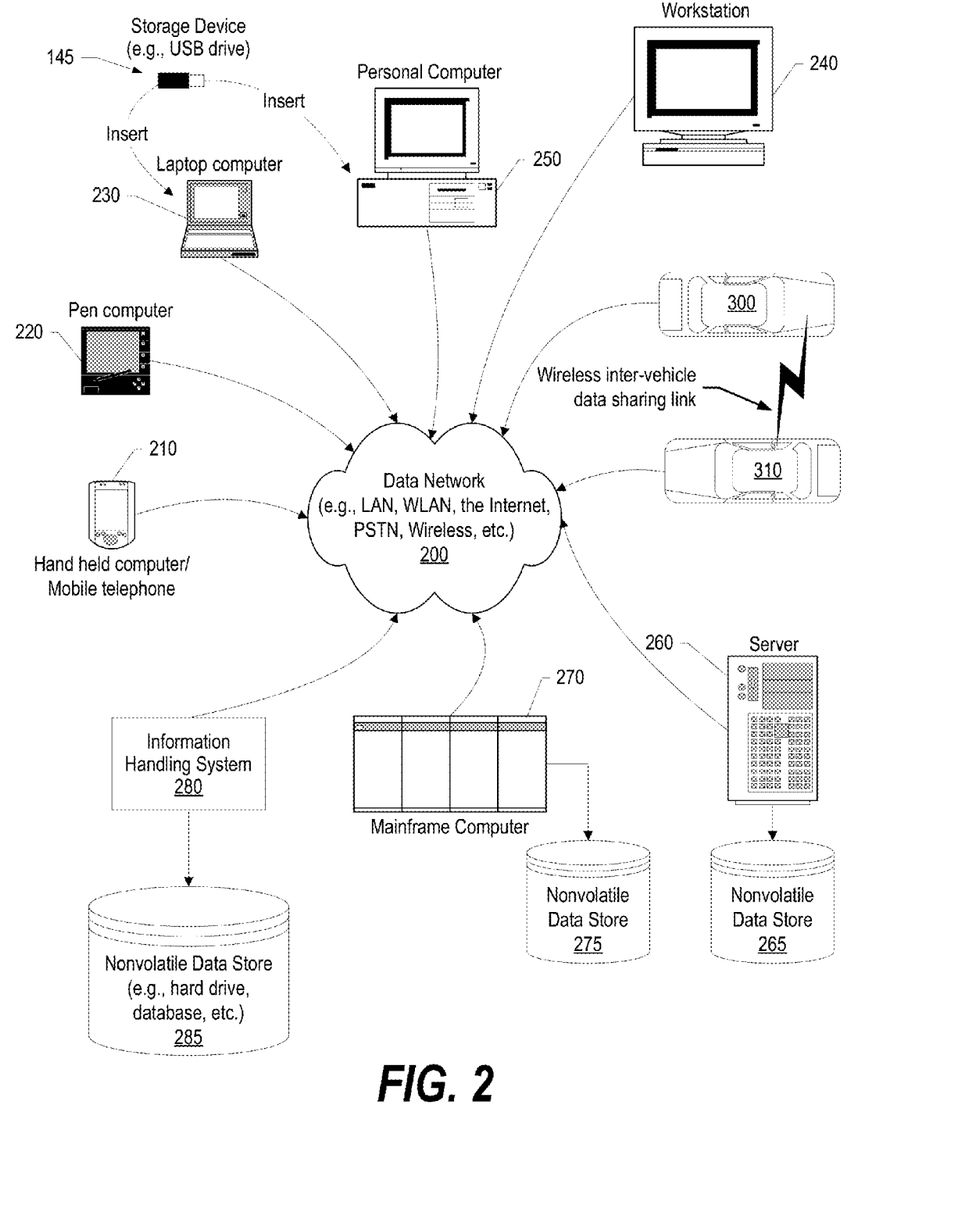
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. As described herein, a wireless inter-vehicle data sharing link is established between information handling system operating in two different vehicles (vehicle 300 and vehicle 310). The data collected, maintained, and shared by the vehicles can be distributed to a variety of information handling system that may be used to further analyze the collected data and use more sophisticated processes to automate predictive vehicle maintenance. Other types of information handling system that may be used to further analyze the vehicle data are also shown in FIG. 2.

Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-7 depict an approach that can be executed on an information handling system, such as a mobile device, and computer network as shown in FIGS. 1-2 to provide predictive vehicle maintenance recommendations. The core idea of this approach is to provide a system and method of vehicles gathering, sharing, and utilizing statistical information for the purposes of predictive maintenance. The approach leverages techniques of peer-to-peer computing, wireless communication, and statistical analysis to provide predictive vehicle maintenance. Using current Bluetooth technology, vehicles passing each other at 60 mph have the ability to exchange approximately 8 Mbits of data. Using the approach described herein with this given bandwidth, vehicles can exchange information pertaining to the make, model and year of the vehicle, sensor information gathered by the vehicle, maintenance history of the vehicle stored in a data store at the vehicle, and geographical data, such as gathered through GPS devices, detailing the geographic areas in which the vehicle has been operated. By gathering this information from a number of passing vehicles, the receiving vehicle can compare its sensor data with other sensor data from the region to determine any predictive maintenance needed.

In one embodiment of the approach described herein, no centralized processing or data repository is needed as the data is naturally localized to the various vehicles. In addition, participants (e.g., vehicle users, etc.) may opt out and the statistical data is not maintained or manipulated by a third party. Modern vehicles are becoming equipped with BlueTooth, computation, and touch-screen video that can be utilized in gathering data and generating the predictive vehicle maintenance recommendations. Further details and examples depicting various embodiments of the approach that provides users with predictive vehicle maintenance recommendations are shown in FIGS. 3-7, descriptions of which are found below.

Figure 3:
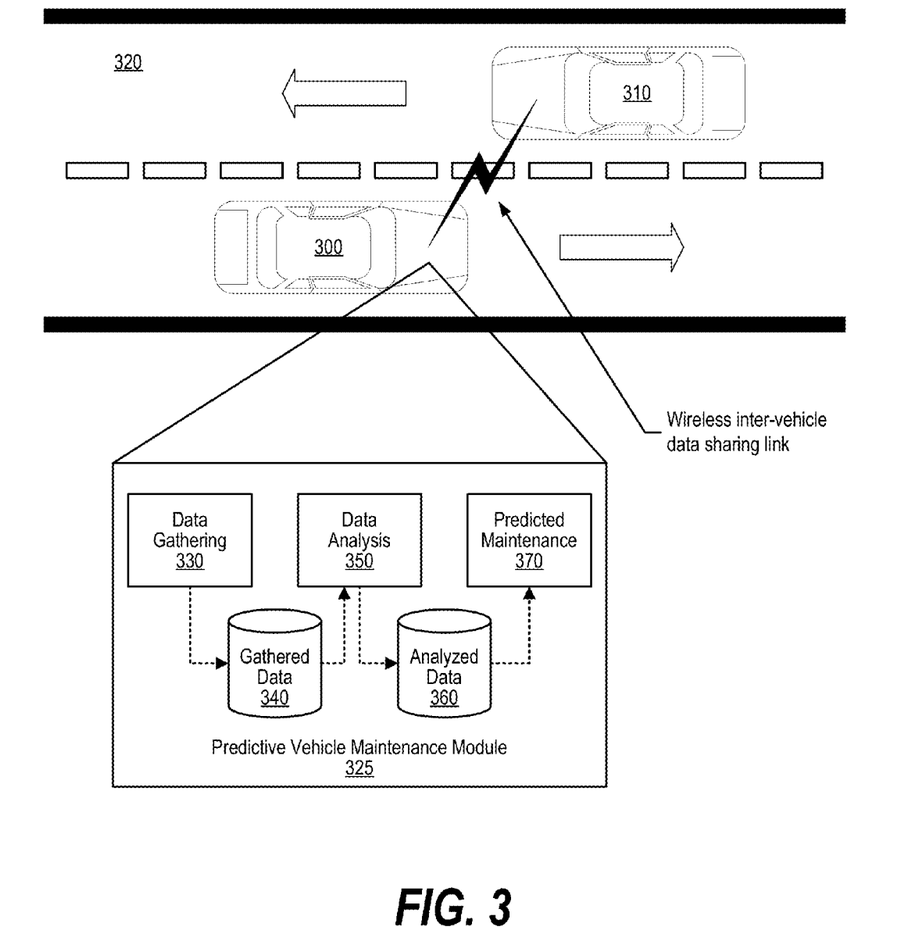
FIG. 3 is a component diagram showing the exchange of vehicle information between vehicles that are in geographical proximity to each other.

FIG. 3 is a component diagram showing the exchange of vehicle information between vehicles that are in geographical proximity to each other. First vehicle 300 has an on-board information handling system that includes predictive vehicle maintenance module 325, such as a set of software routines with access to various data stores. As first vehicle 300 is in geographic proximity to other vehicles, depicted as vehicle 310, a wireless inter-vehicle data sharing link is established between the vehicles. As shown, the geographic proximity may occur when the vehicles are passing each other on a roadway 320.

Predictive vehicle maintenance module 325 includes data gathering routine 330 that gathers data from other vehicles. The data that is gathered from other vehicles is stored in data store 340. Predictive vehicle maintenance module 325 also includes data analysis routine 350 that analyzes data gathered from other vehicles stored in data store 340 and generates analyzed data that is stored in data store 360. The result of the analyzed data is a set of one or more predicted maintenance recommendations 370 that are based on the analyzed data from other vehicles in conjunction with the condition data pertaining to first vehicle 300 as gathered by the first vehicle's sensors and as stored in the first vehicle's maintenance data. In addition, first vehicle 300 transmits its vehicle data to other vehicles, such as vehicle 310.

Each vehicle maintains within its set of on-board computers an "as-maintained"/"as-monitored" vehicle information model. The information model includes registry information, reliability information, condition event data, condition measurement data, diagnostic data, and work management information. Registry information includes the vehicle model nameplate information, asset registries, maintenance data, component breakdown data, and installed resources such as parts, tools, and vehicle consumables. Condition measurement data includes various types of measurement data including scalar data, dynamic data (such as vibration and sound data), test data, sample data, and binary data. Diagnostic data includes diagnostic data, prognostic data, and vehicle health assessment information. The data in the vehicle information model is shared by transferring the data between vehicle 300 and vehicle 310 as the vehicles pass each other on a roadway, such as roadway 320. In one embodiment, a solution establishes a community of vehicles owners that subscribe to a service. The registered vehicles share operations and maintenance data with other similar vehicles (e.g., the same make and model, etc.). As the underlying information content is enhanced, the predictive maintenance capabilities are enhanced, providing the vehicle owners with insightful alerts and recommendations for predicatively maintaining the vehicles.

Figure 4:
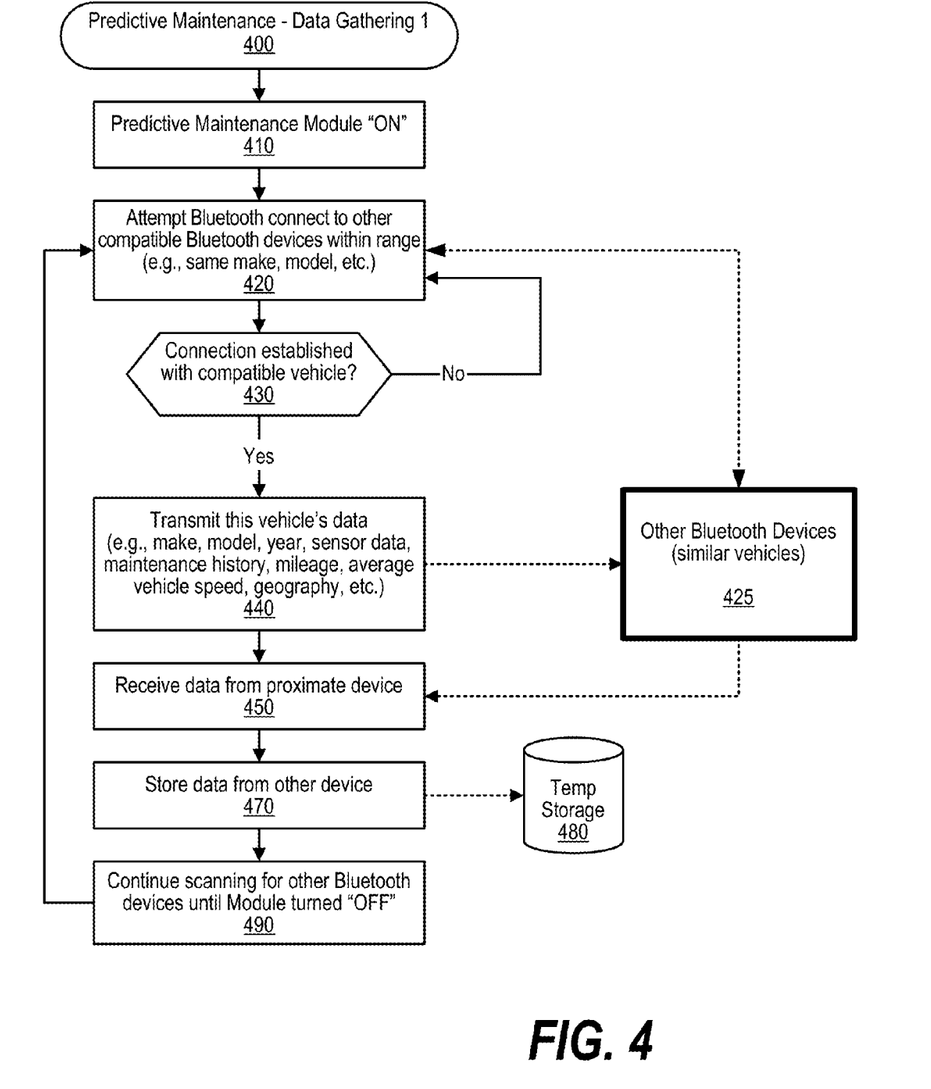
FIG. 4 is a first flow chart showing the data gathering steps utilized in collecting vehicle maintenance data from other similar vehicles.

FIG. 4 is a first flow chart showing the data gathering steps utilized in collecting vehicle maintenance data from other similar vehicles. Processing commences at 400 when, as shown in step 410, the predictive maintenance module is turned "on" by a user or owner of the vehicle. In one embodiment, the user can opt out of predictive maintenance functionality by turning the predictive maintenance module off thereby inhibiting the sharing of vehicle data with other similar vehicles. When the predictive maintenance module is turned on, at step 420, the information handling system running in the vehicle attempts to make a wireless connection, such as a Bluetooth connection, with other compatible wireless adapters that are within the wireless range of the vehicle, such as other vehicles that are passing the vehicle on a roadway. Similar vehicles are those vehicles with which the vehicle data is shared, such as other vehicles with the same, or compatible, make, model, and year.

A decision is made as to whether the vehicle has established a wireless connection with another (compatible) vehicle (decision 430). If the vehicle has not established a wireless connection with another vehicle, then decision 430 branches to the "no" branch looping back to step 420 as the vehicle continues to search of compatible vehicles with which to share vehicle information. Once a connection is established with a compatible vehicle, decision 430 branches to the "yes" branch for data gathering and transmission.

At step 440, the vehicle transmits its vehicle data, such as the data outlined in the vehicle information model described above with respect to FIG. 3. The data is transmitted wirelessly (e.g., using Bluetooth, etc.) where it is received by other the other vehicle's wireless communication adapter 425. In addition, at step 450, the vehicle data from the other vehicle is received with the received data being data pertaining to the other vehicle organized in the vehicle information model previously referenced. At step 470, the routine stores the data received from the other vehicle in temporary data store 480 for future processing. At step 490, the vehicle's information handling system continues scanning for other similar vehicles as outlined above with the scanning continuing until the predictive maintenance module is turned "off." In addition, in one embodiment, the data gathering routine can continue gathering data even while the vehicle is not in use, such as when parked in a parking lot.

Figure 5:
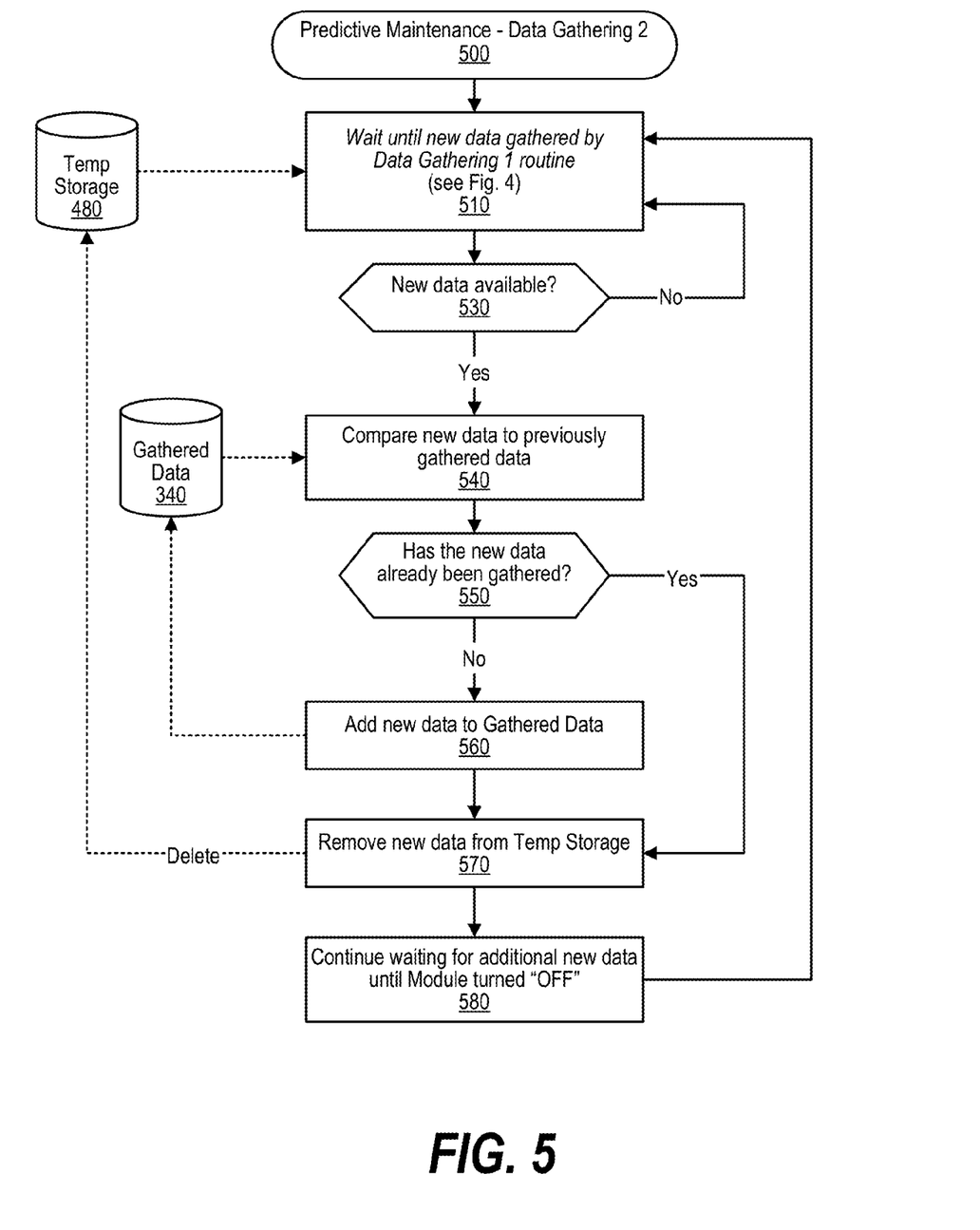
FIG. 5 is a second flow chart showing the data gathering steps utilized in collecting vehicle maintenance data from other similar vehicles.

FIG. 5 is a second flow chart showing the data gathering steps utilized in collecting vehicle maintenance data from other similar vehicles. The routine shown in FIG. 5 works in conjunction with the data gathering routine shown in FIG. 4. In FIG. 4, the first data gathering process stored the gathered data in temporary storage area 480. The process shown in FIG. 5 waits for data to be placed in temporary storage area 480 and, once data arrives, FIG. 5 processes the data and stores the processed data in gathered data store 340.

FIG. 5 processing commences at 500 whereupon, at step 510, the process waits for new data to be gathered by the first data gathering routine and stored in temporary storage area 480. A decision is made as to whether new data has arrived in temporary storage area 480 (decision 530). If no new data has arrived, then decision 530 branches to the "no" branch which loops back to step 510 to continue waiting for new data to arrive. Once new data arrives, decision 530 branches to the "yes" branch for further processing.

At step 540, the process compares the new data that recently arrived in temporary storage area 480 with previously gathered data stored already stored in gathered data 340. A decision is made as to whether the new data has already been collected by the vehicle (decision 550). For example, while driving around town, a vehicle may pass a particular vehicle several times, in which case the process inhibits the gathering of redundant data. If the new data stored in temporary storage area 480 has not yet been gathered by the vehicle, then decision 550 branches to the "no" branch whereupon, at step 560, the new data is added to gathered data 340. On the other hand, if the new data is already present in gathered data 340, then decision 550 branches to the "yes" branch bypassing step 560 to avoid repeatedly gathering data from the same vehicle. In one embodiment, a timestamp is included in the records stored gathered data 340 so that after a period of time, such as a week or a month, data from a particular vehicle is re-gathered to refresh the vehicle's gathered data with any new vehicle data available from the other vehicle.

At step 570, the new data is removed (deleted from) temporary storage area 480. At step 580, the vehicle's information handling system continues checking temporary storage area 480 for new data as outlined above with the process continuing until the predictive maintenance module is turned "off." In addition, in one embodiment, the process can continue gathering data even while the vehicle is not in use, such as when parked in a parking lot or garage.

Figure 6:
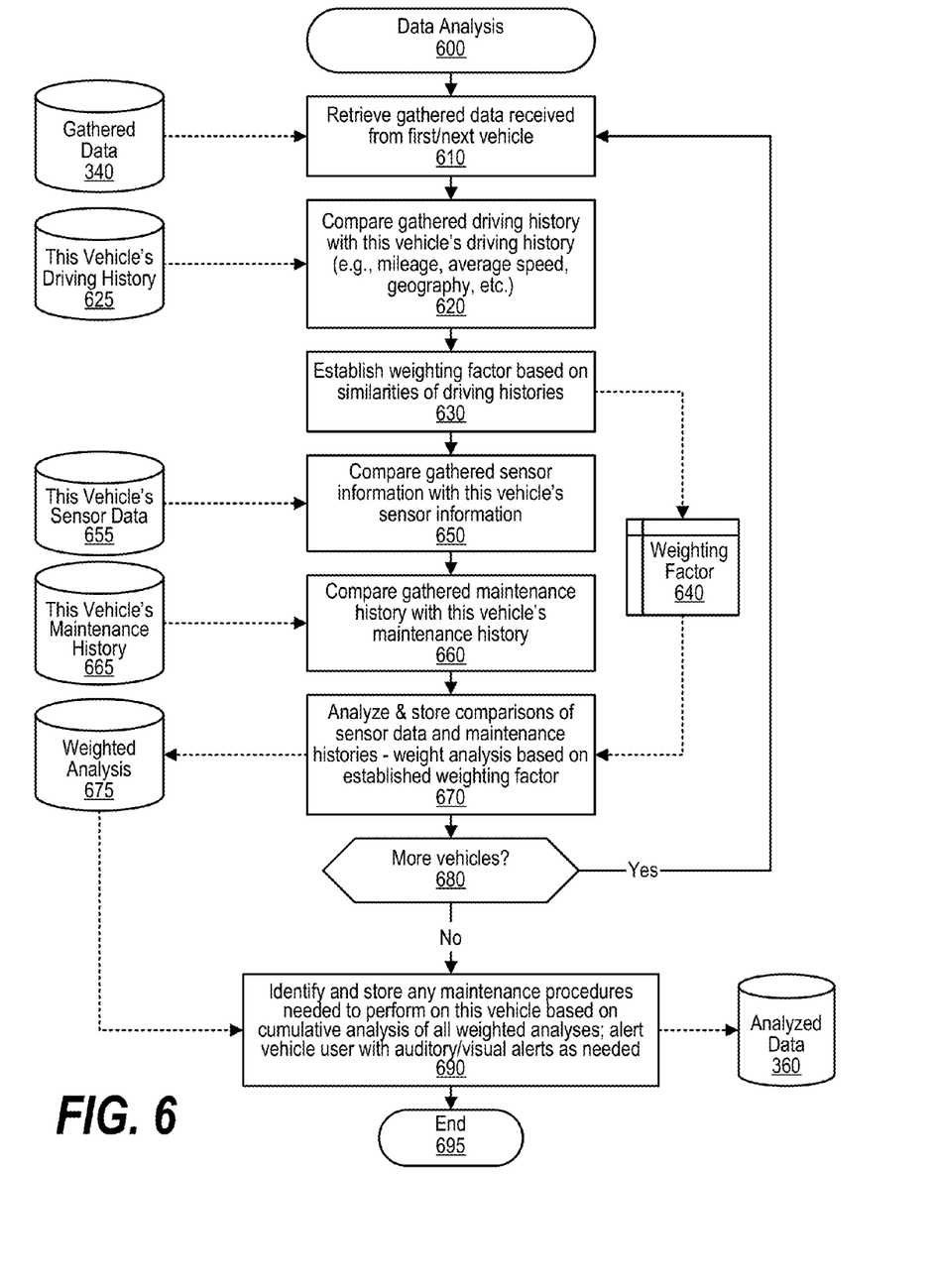
FIG. 6 is a depiction of a flowchart showing the logic used to analyze the vehicle maintenance data received from other vehicles that result in one or more predictive vehicle maintenance recommendations.

FIG. 6 is a depiction of a flowchart showing the logic used to analyze the vehicle maintenance data received from other vehicles that result in one or more predictive vehicle maintenance recommendations. Processing commences at 600 whereupon, at step 610, data gathered from the first vehicle (e.g., a data record, etc.) is retrieved from gathered data 340. At step 620, the process compares the driving history identified in the retrieved vehicle data with this vehicle's driving history from data store 625. Compare gathered driving history with this vehicle's driving history. Examples of driving history data include data such as overall mileage, average speed, geography, etc. At step 630, one or more weighting factors are established, or generated, based on similarities of the vehicle data. The established weighting factors are stored in memory area 640. For example, if the vehicles might be of the same make, model, and year but one of the vehicles may have significantly more miles accrued than the other vehicle, or one vehicle may have a significantly greater average speed indicating that it is used more on high speed thoroughfares while the other vehicle is used primarily in city traffic.

At step 650, the process compares the gathered sensor information from the other vehicle with this vehicle's sensor information retrieved from data store 655 and, at step 660, the process further compares the gathered maintenance history pertaining to the other vehicle with this vehicle's maintenance history retrieved from data store 665. At step 670, the process analyzes and stores comparisons of sensor data and maintenance histories with the analysis being weighted based on the established weighting factor stored in memory area 640. The weighted analysis is stored in data store 675.

A decision is made as to whether there is data pertaining to additional vehicles in gathered data 340 (decision 680). If there is data pertaining to additional vehicles in gathered data 340, then decision 680 branches to the "yes" branch which loops back to retrieved the data corresponding to the next vehicle from which data has been gathered, establish weighting factors, and perform a comparison analysis as described above with the resulting analysis being stored in data store 675. This looping continues until there is no more vehicle data from other vehicles to process and analyze, at which point decision 680 branches to the "no" branch. At step 690, the process Identifies and stores any maintenance procedures needed to perform on this vehicle based on cumulative analysis of all weighted analyses. These predictive vehicle maintenance recommendations are stored in analyzed data store 360. In addition, in one embodiment, the process compares the predictive vehicle maintenance recommendations to a set of criteria and, if a recommendation matches a criteria, the process alerts the vehicle user with an auditory and/or visual alert. For example, if a predictive vehicle maintenance recommendation pertains to safety, such as the vehicle's braking system, the system can alert the user of the situation so that the predictive vehicle maintenance before such critical systems are compromised. Analysis processing thereafter ends at 695.

Figure 7:
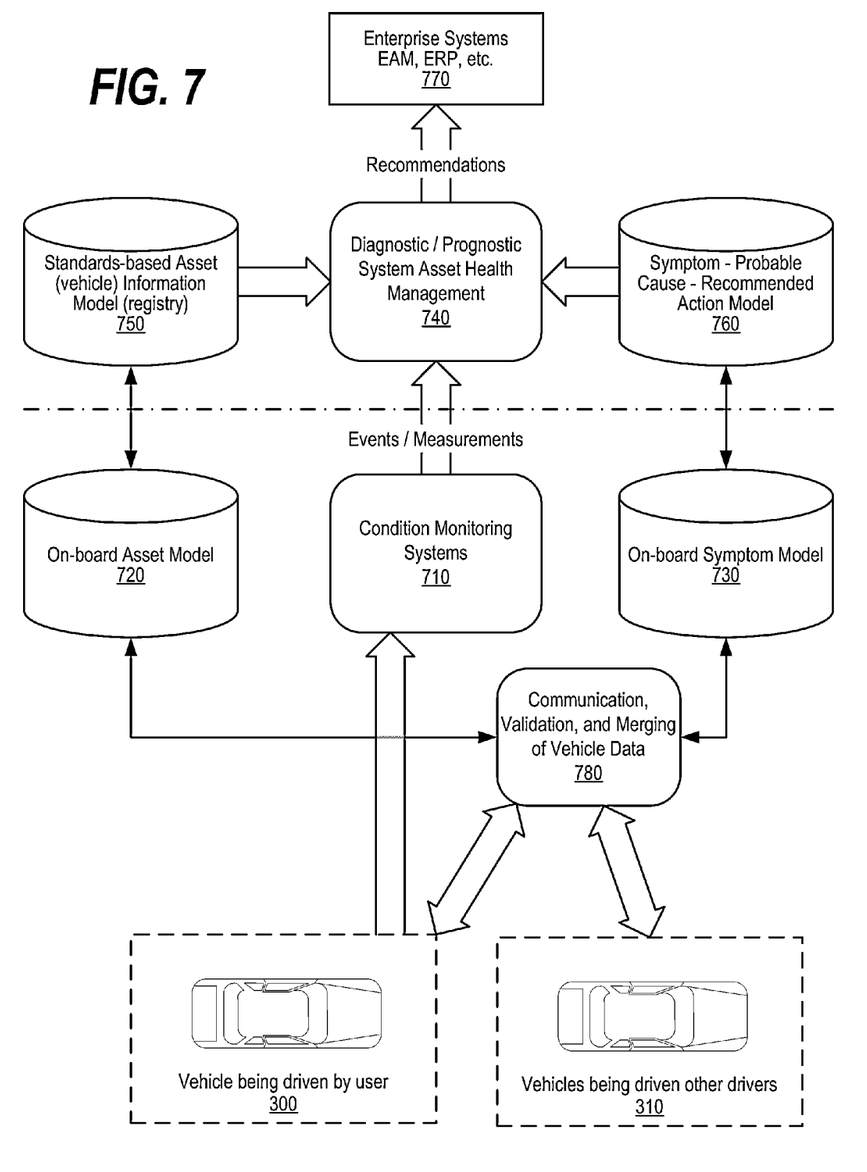
FIG. 7 is a depiction of one embodiment showing processes and data stores used to capture events and measurements that result in predictive vehicle maintenance recommendations.

FIG. 7 is a depiction of one embodiment showing processes and data stores used to capture events and measurements that result in predictive vehicle maintenance recommendations. Vehicle 300 is being driven or otherwise used by the user while vehicles 310 are those similar vehicles driven by others. The vehicle information model includes the data gathered at the vehicle, such as sensor and maintenance data, as well as data gathered from other similar vehicles as previously described in FIGS. 3-6.

Vehicle 300 has condition monitoring systems 710 that monitor the condition of vehicle 300. The output from Condition Monitoring Systems 710 are events and measurements that are provided to Diagnostic/Prognostic System Asset Health Management process 740. Condition Monitoring Systems 710 includes state detection, data manipulation, and data acquisition processes. Diagnostic/Prognostic System Asset Health Management process 740 includes advisory generation, prognostic assessment, and health assessment processes. The result of Diagnostic/Prognostic System Asset Health Management process 740 are predictive vehicle maintenance recommendations that are provided to Enterprise Systems 770 for use in predicatively maintaining the vehicle.

Diagnostic/Prognostic System Asset Health Management process 740 also receives information from Standards-based Asset (vehicle) Information Model (registry) 750 as well as from Symptom—Probable Cause—Recommended Action Model 760. Standards-based Asset (vehicle) Information Model (registry) 750 includes various categories of data including the asset model, as-designed data, serialized asset data, as-monitored data, and as-maintained data. As shown, the Standards-based Asset (vehicle) Information Model (registry) 750 includes data received from On-board Asset Model 720 which includes the asset make/model identification, the as-maintained delta, and the as-monitored data.

Symptom—Probable Cause—Recommended Action Model 760 includes data received from On-board Symptom Model 730. Symptom—Probable Cause—Recommended Action Model 760 includes symptom data, probable cause data, and recommended action data. On-board Symptom Model 730 includes an aggregated model through "social" networking by gathering data from a community of similar vehicles as well as this vehicle's maintenance actions that have been performed on the vehicle. Both of the on-board models (On-board Asset Model 720 and On-board Symptom Model 730) include data used in communicating with other vehicles as described in FIGS. 3-6 via Communication, Validation, and Merging of Vehicle Data process 780.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system to automate predictive vehicle maintenance, the method comprising:

receiving, at the information handling system included in a first vehicle, a plurality of wireless vehicle data transmissions from a plurality of other vehicles in geographic proximity to the vehicle, wherein the first vehicle corresponds to a first vehicle type;

identifying a set of received vehicle data transmissions corresponding to a set of the plurality of the other vehicles with vehicle types that are similar to the first vehicle type; and analyzing the identified set of received vehicle data transmissions with respect to a plurality of vehicle maintenance data corresponding to the first vehicle, wherein the analyzing comprises utilizing predictive analysis according to a standard asset health assessment model utilizing aggregated information, the analysis resulting in a set of one or more predictive vehicle maintenance recommendations pertaining to the first vehicle.

2. The method of claim 1 further comprising:
comparing the one or more predictive vehicle maintenance recommendations to one or more criteria; and
alerting a user of the first vehicle to at least one of the one or more predictive vehicle maintenance recommendations based on the comparison.

3. The method of claim 1 wherein the received vehicle data transmissions is selected from a group consisting of make, model, year, sensor information, maintenance history, and geography.

4. The method of claim 1 further comprising:
wherein the aggregated information is selected from a group consisting of reliability information, condition event, condition measurement, diagnostic, prognostic, health assessment, and work management.

5. The method of claim 4 wherein the condition measurement data is selected from the group consisting of a scalar measurement data, a dynamic measurement data, a vibration measurement data, a sound measurement data, a test measurement data, a sample measurement data, and a binary measurement data.

6. The method of claim 1 further comprising:
establishing a wireless Bluetooth connection with each of the plurality of other vehicles when each of the plurality of other vehicles is in range of the first vehicle;
exchanging vehicle type data with each of the plurality of other vehicles after the wireless Bluetooth connection is established;
identifying the set of other vehicles with vehicle types that are similar to the first vehicle type based on the exchanged vehicle type data; and
receiving a set of vehicle maintenance data included in the received vehicle data transmissions from the set of other vehicles with similar vehicle types to the first vehicle via the established Bluetooth connection.

7. The method of claim 6 further comprising:
transmitting the first vehicle's vehicle maintenance data to the other vehicles with similar vehicle types via the established Bluetooth connection.

8. An information handling system included in a first vehicle, the information handling system comprising:
one or more processors;
a memory coupled to at least one of the processors;
a nonvolatile storage device;
a wireless communication adapter; and
a set of instructions stored in the memory and executed by at least one of the processors to automate predictive vehicle maintenance, wherein the set of instructions perform actions of:
receiving, at the wireless communication adapter, a plurality of vehicle data transmissions from a plurality of other vehicles in geographic proximity to the vehicle, wherein the first vehicle corresponds to a first vehicle type;

identifying a set of received vehicle data transmissions corresponding to a set of the plurality of the other vehicles with vehicle types that are similar to the first vehicle type; and analyzing the identified set of received vehicle data transmissions with respect to a plurality of vehicle maintenance data corresponding to the first vehicle, wherein the analyzing comprises utilizing predictive analysis according to a standard asset health assessment model utilizing aggregated information, the analysis resulting in a set of one or more predictive vehicle maintenance recommendations pertaining to the first vehicle.

9. The information handling system of claim 8 wherein the actions performed further comprise:
comparing the one or more predictive vehicle maintenance recommendations to one or more criteria; and
alerting a user of the first vehicle to at least one of the one or more predictive vehicle maintenance recommendations based on the comparison.

10. The information handling system of claim 8 wherein the received vehicle data transmissions is selected from a group consisting of make, model, year, sensor information, maintenance history, and geography.

11. The information handling system of claim 8 wherein the actions performed further comprise:
wherein the aggregated information is selected from a group consisting of reliability information, condition event, condition measurement, diagnostic, prognostic, health assessment, and work management.

12. The information handling system of claim 11 wherein the condition measurement data is selected from the group consisting of a scalar measurement data, a dynamic measurement data, a vibration measurement data, a sound measurement data, a test measurement data, a sample measurement data, and a binary measurement data.

13. The information handling system of claim 8 wherein the actions performed further comprise:
establishing a wireless Bluetooth connection with each of the plurality of other vehicles when each of the plurality of other vehicles is in range of the first vehicle;
exchanging vehicle type data with each of the plurality of other vehicles after the wireless Bluetooth connection is established;
identifying the set of other vehicles with vehicle types that are similar to the first vehicle type based on the exchanged vehicle type data; and
receiving a set of vehicle maintenance data included in the received vehicle data transmissions from the set of other vehicles with similar vehicle types to the first vehicle via the established Bluetooth connection.

14. The information handling system of claim 13 wherein the actions performed further comprise:
transmitting the first vehicle's vehicle maintenance data to the other vehicles with similar vehicle types via the established Bluetooth connection.

15. A computer program product stored in a non-transitory computer readable medium, comprising computer instructions that, when executed by an information handling system, causes the information handling system to perform actions comprising:
receiving, at the information handling system included in a first vehicle, a plurality of wireless vehicle data transmissions from a plurality of other vehicles in geographic proximity to the vehicle, wherein the first vehicle corresponds to a first vehicle type;

identifying a set of received vehicle data transmissions corresponding to a set of the plurality of the other vehicles with vehicle types that are similar to the first vehicle type; and analyzing the identified set of received vehicle data transmissions with respect to a plurality of vehicle maintenance data corresponding to the first vehicle, wherein the analyzing comprises utilizing predictive analysis according to a standard asset health assessment model utilizing aggregated information, the analysis resulting in a set of one or more predictive vehicle maintenance recommendations pertaining to the first vehicle.

16. The computer program product of claim 15 wherein the actions performed further comprise:

comparing the one or more predictive vehicle maintenance recommendations to one or more criteria; and alerting a user of the first vehicle to at least one of the one or more predictive vehicle maintenance recommendations based on the comparison.

17. The computer program product of claim 15 wherein the received vehicle data transmissions is selected from a group consisting of make, model, year, sensor information, maintenance history, and geography.

18. The computer program product of claim 15 wherein the actions performed further comprise:

wherein the aggregated information is selected from a group consisting of reliability information, condition event, condition measurement, diagnostic, prognostic, health assessment, and work management.

19. The computer program product of claim 18 wherein the condition measurement data is selected from the group consisting of a scalar measurement data, a dynamic measurement data, a vibration measurement data, a sound measurement data, a test measurement data, a sample measurement data, and a binary measurement data.

20. The computer program product of claim 15 wherein the actions performed further comprise:

establishing a wireless Bluetooth connection with each of the plurality of other vehicles when each of the plurality of other vehicles is in range of the first vehicle;

exchanging vehicle type data with each of the plurality of other vehicles after the wireless Bluetooth connection is established;

identifying the set of other vehicles with vehicle types that are similar to the first vehicle type based on the exchanged vehicle type data;

receiving a set of vehicle maintenance data included in the received vehicle data transmissions from the set of other vehicles with similar vehicle types to the first vehicle via the established Bluetooth connection; and transmitting the first vehicle's vehicle maintenance data to the other vehicles with similar vehicle types via the established Bluetooth connection.

* * * * *